United States Patent
Pigott et al.

(10) Patent No.: US 8,242,763 B2
(45) Date of Patent: Aug. 14, 2012

(54) DC TO DC CONVERTER HAVING ABILITY OF SWITCHING BETWEEN CONTINUOUS AND DISCONTINUOUS MODES AND METHOD OF OPERATION

(75) Inventors: John M. Pigott, Phoenix, AZ (US); Gustavo J. Mehas, Mercer Island, WA (US); Gerrit van der Horn, Delft (NL); Richard Willem Visee, The Hague (NL)

(73) Assignee: Freescale Semiconductor, Inc., Austin, TX (US)

( * ) Notice: Subject to any disclaimer, the term of this patent is extended or adjusted under 35 U.S.C. 154(b) by 340 days.

(21) Appl. No.: 12/723,239

(22) Filed: Mar. 12, 2010

(65) Prior Publication Data

US 2011/0221414 A1 Sep. 15, 2011

(51) Int. Cl.
G05F 1/40 (2006.01)
G05F 1/10 (2006.01)
(52) U.S. Cl. .................. 323/284; 323/222; 323/235
(58) Field of Classification Search .......... 323/222, 323/225, 235, 282–285, 290
See application file for complete search history.

(56) References Cited

U.S. PATENT DOCUMENTS

| 4,536,700 | A | 8/1985 | Bello et al. |
| 5,894,216 | A | 4/1999 | Cohen |
| 5,929,690 | A | 7/1999 | Williams |
| 5,994,882 | A | 11/1999 | Ma |
| 6,366,066 | B1 | 4/2002 | Wilcox |
| 6,531,854 | B2 | 3/2003 | Hwang |
| 6,674,274 | B2 * | 1/2004 | Hobrecht et al. ............ 323/285 |
| 6,956,361 | B1 | 10/2005 | Mozipo et al. |
| 7,471,072 | B2 * | 12/2008 | Fogg et al. ................... 323/284 |
| 7,612,543 | B2 | 11/2009 | Yu et al. |
| 2009/0027020 | A1 * | 1/2009 | Qiu et al. ..................... 323/282 |
| 2009/0251117 | A1 | 10/2009 | Pigott |

OTHER PUBLICATIONS

ZL2006 Data Sheet; Intersil Zilker Labs; Feb. 18, 2009; 45 pages.
PCT/US2011/023616, International Patent Application, PCT Search Report and Written Opinion dated Oct. 4, 2011.

* cited by examiner

Primary Examiner — Jessica Han

(57) ABSTRACT

A DC to DC converter has first and second transistor coupled at a first node and coupled between first and second power supply terminals. An inductor has a first terminal coupled to the first node and a second terminal coupled to an output terminal for receiving a variable load. Transistor drive circuitry controls conduction of the first and second transistor in a non-overlapping conduction operation. A duty cycle controller controls a duty cycle for the first transistor and the second transistor. Control circuitry determines a mode of operation by monitoring cycles of operation and detecting a predetermined pattern of cycles in which inductor current becomes negative. A first mode of operation permits both the first transistor and the second transistor to alternately conduct and a second mode of operation does not permit the second transistor to conduct during each cycle when the inductor current is reduced to substantially zero.

20 Claims, 2 Drawing Sheets

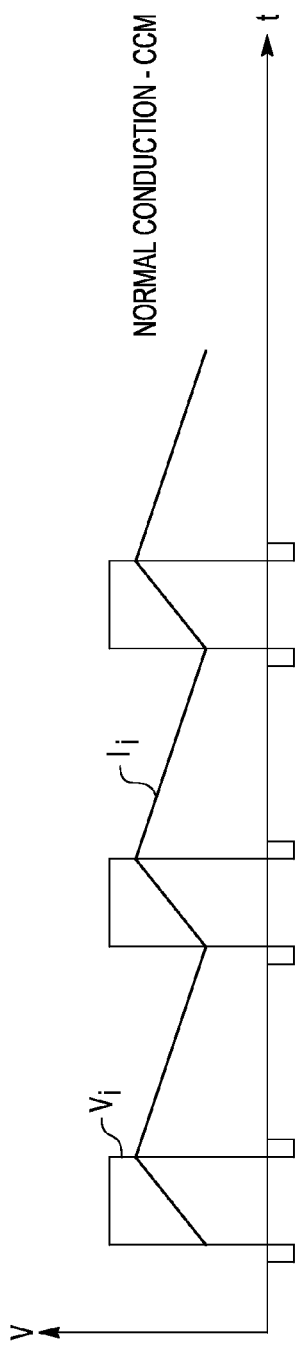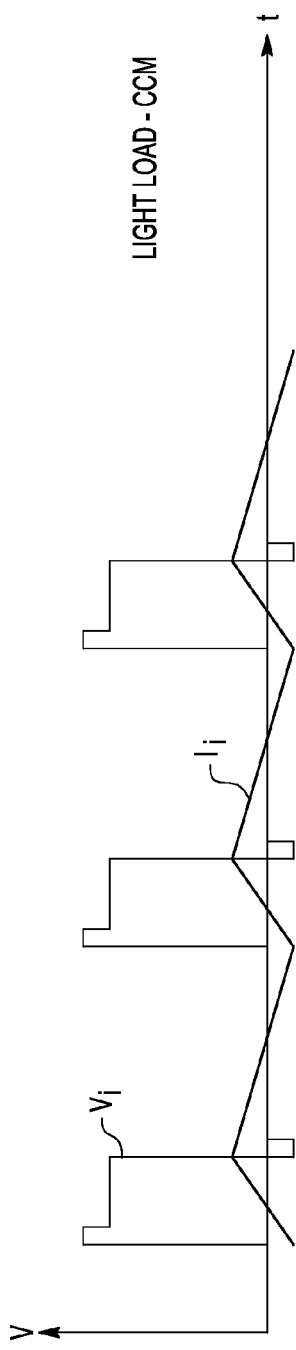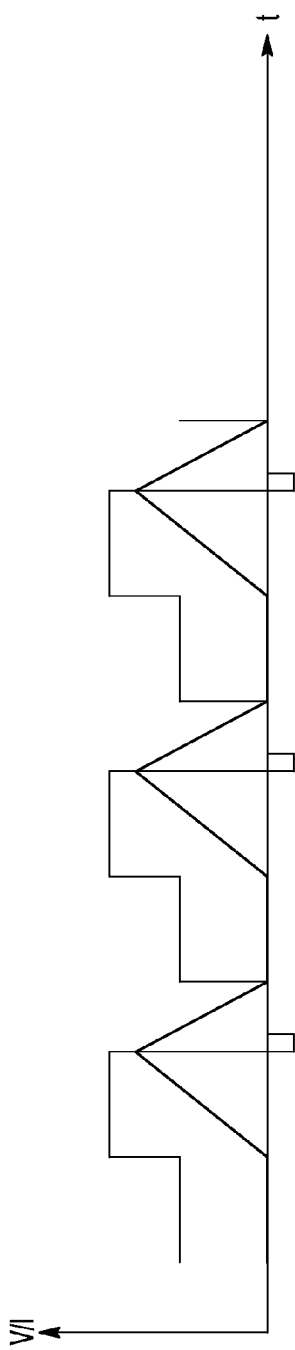

DC TO DC CONVERTER HAVING ABILITY OF SWITCHING BETWEEN CONTINUOUS AND DISCONTINUOUS MODES AND METHOD OF OPERATION

RELATED APPLICATION

This application is related to U.S. application Ser. No. 12/723,223, titled, "DC to DC CONVERTER HAVING SWITCH CONTROL AND METHOD OF OPERATION," by Pigott, assigned to the assignee hereof, and filed on even date herewith.

BACKGROUND

1. Field

This disclosure relates generally to DC to DC to converters, and more specifically, to DC to DC converters having switch control.

2. Related Art

DC to DC converters have an important role in systems because it is not uncommon for the power supply that is available to have a wide voltage range. Because the power supply may be a battery, it is desirable that the DC to DC converter perform its conversion efficiently. Efficiency is reduced by any power used by the DC to DC converter itself. Thus, for increasing efficiency, it is desirable to eliminate or reduce any power consumed during the conversion. Typically a diode is used in the conversion process, but any current passing through the diode is a loss of power due to the voltage drop of about 0.7 volt of a forward biased PN junction. Attempts have been made to eliminate this diode drop by using a switched transistor, but timing of the transistor is very critical for proper operation. Further when a DC to DC converter is in continuous conduction mode (CCM) and the load becomes very light, current can actually flow back from the load to the DC to DC converter. When this occurs, this is a waste of power.

Thus, there is a need to eliminate or improve upon the issues raised above in performing a DC to DC conversion.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a first timing diagram helpful in understanding the operation of the embodiment of FIG. 1;

FIG. 3 is a second timing diagram helpful in understanding the operation of the embodiment of FIG. 1; and FIG. 4 is a third timing diagram helpful in understanding the operation of the embodiment of FIG. 1.

DETAILED DESCRIPTION

Figure 1:
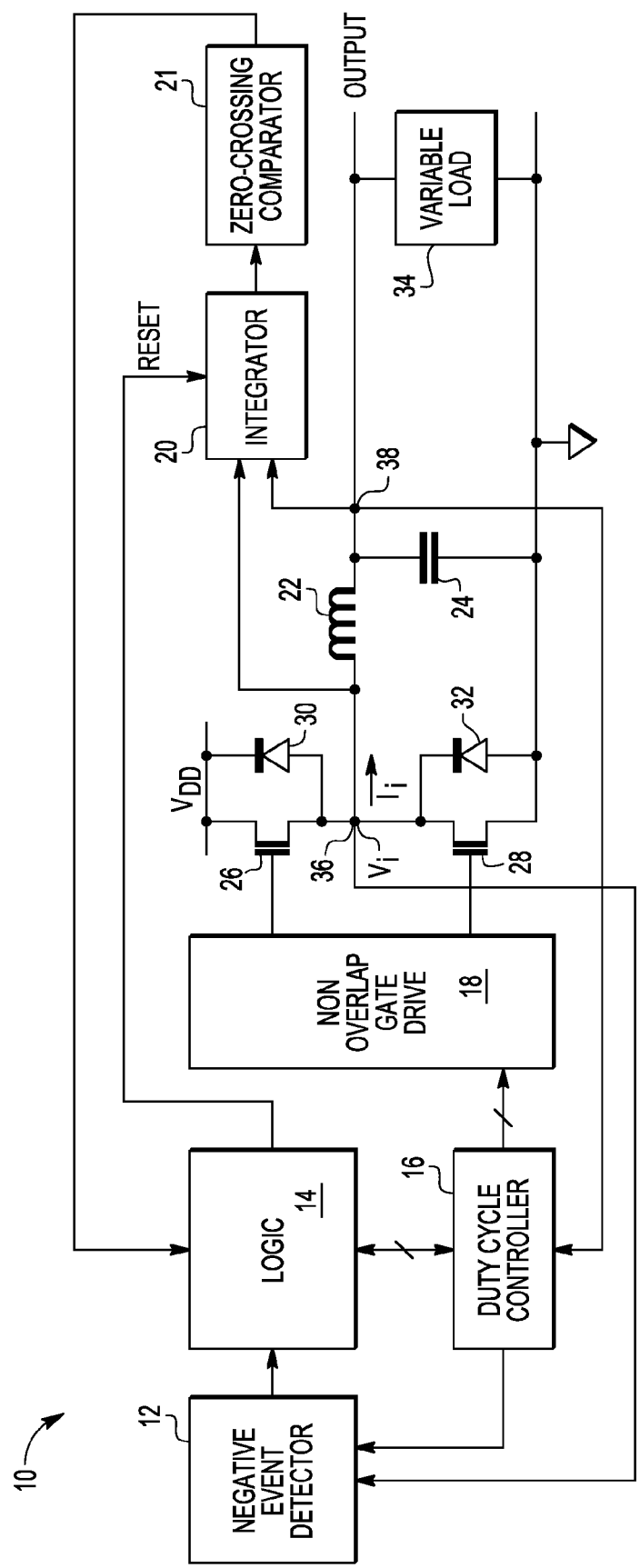
FIG. 1 is a block diagram of an embodiment.

In one aspect a DC to DC converter has a switch in parallel with a diode that is used to bypass the diode to improve efficiency. In a continuous mode of operation the timing of the switch is designed to minimize, within some margin, the amount of time the diode is not being bypassed. If the continuous mode of operation results in current flowing in the opposite direction from normal operation, the switch is caused to be non-conductive to prevent this opposite direction current flow. This is better understood by reference to the drawings and the following description.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Shown in FIG. 1 is a DC to DC converter 10 having a negative event detector 12, logic 14, a controller 16 that controls duty cycle, a gate drive 18 that is non-overlapping, an integrator 20, a comparator 21 that detects zero-crossing, an inductor 22, a capacitor 24, a transistor 26 that is N channel, a transistor 28 that is N channel, a diode 30, and a diode 32. Also shown in FIG. 1 is a load 34 that can vary. Detector 12 has a first input coupled to a node 36, a second input coupled to first output of controller 16, and an output coupled to a first input of logic 14. Controller 16 has a second output coupled to a first input of gate drive 18, a first input coupled to node 38, and a first input/output (I/O) coupled to a first I/O of logic 14. This I/O is preferably not multiplexed but that possibility is not necessarily excluded. Gate drive 18 has a first output coupled to a gate of transistor 26 and a second output coupled to a gate of transistor 28. Integrator 20 has a first input coupled to node 36, a second input coupled to node 38, a third input coupled to logic 14, and an output coupled to a first input of comparator 21. Comparator 21 has an output coupled to a second input of logic 14. Inductor 22 has a first terminal coupled to node 36 and a second terminal coupled to node 38. Transistor 26 has a drain coupled to VDD which is a positive power supply terminal and a source coupled to node 36. Transistor 28 has a drain coupled to node 36 and a source coupled to ground which could be a different negative power supply. Diode 30 has an anode coupled to node 36 and a cathode coupled to VDD. Diode 32 has an anode coupled to ground and a cathode coupled to node 36. Capacitor 24 has a first terminal coupled to node 38 and a second terminal coupled to ground.

Converter 10 is designed to be able handle a relatively large load in a continuous conduction mode (CCM) in which current is continuously flowing into inductor 22 at node 36. The current flowing into inductor 22 at node 36 is shown as current Ii. The voltage at node 36 is shown as Vi. In normal operation in CCM, controller 16 provides signals to gate drive 18 which indicate the duty cycle for transistor 26 to be conductive, which may be considered an enabled condition. This normal operation is shown in FIG. 2 which shows that voltage Vi is relatively high as inductor 22 is supplied with current from VDD through enabled transistor 26. While transistor 26 is enabled, current Ii increases as current is supplied to load 34 and also stored in inductor 22. When transistor 26 is non-conductive, which may be considered disabled, and transistor 28 is enabled, voltage Vi is at substantially ground and current Ii is decreasing but still well above zero. In this condition, current is coming out of ground through transistor 28 and into inductor 22 at node 36. There is a duration between one of transistors 26 and 28 becoming disabled and the other becoming enabled in which both transistors 26 and 28 are disabled. In such case, current Ii comes from ground through diode 32 and voltage Vi is a diode-drop below ground. This is conventional operation for DC to DC converter in CCM mode.

There are other times though, which may be quite lengthy, when load 34 is light and little power is required. The case in which CCM is continued for the light load condition is shown FIG. 3. As for the normal CCM case, current Ii increases during transistor 26 being enabled and decreases when transistor 28 transitions to being enabled. Because load 34 is light, the total amount of current is low so that the time of current Ii decreasing results in current Ii becoming negative so that current actually passes from node 36 to ground through transistor 28. This is a waste of power. Although this power loss may be small, it can continue for a long time. This may occur, for example in a standby mode of a system. This power loss, in a battery operated system, may thus adversely impact standby time of the system. In this light load CCM, at the time just before transistor 26 is enabled and transistor 28 has just transitioned to being disabled, current Ii flows through diode 30 to VDD so that voltage Vi is a diode-drop above VDD. In normal conduction CCM as shown in FIG. 2, voltage Vin actually drops to a diode drop below VDD in response to transistor 28 becoming disabled and voltage Vin does not rise until transistor 26 is enabled.

Detector 12 detects each cycle in which current Ii is negative at the end of each cycle, which is considered a negative event when it occurs because current Ii goes negative and because this negatively impacts efficiency, by detecting when voltage Vi rises in relation to transistor 28 being disabled. When transistor 28 is disabled when current Ii is positive, voltage Vi responds by decreasing to a diode drop below ground. When transistor 28 is disabled when current Ii is negative, voltage Vi responds by increasing to a diode drop above VDD. Detector 12 receives clock edge information from controller 16 as to when transistor 28 is to become disabled. At this point, detector 12 senses if voltage Vi rises. Upon detecting a rise in Vi upon transistor 28 becoming disabled, a signal is sent to logic 14 indicating that a negative event has occurred. Logic 14 uses the negative event information to decide if a mode change to a discontinuous conduction mode (DCM) in which for at least some time current Ii is prevented from flowing so as to prevent or at least reduce the magnitude of negative current Ii. Logic 14 may include a counter which counts the negative events and based on the count decide to put DC to DC converter into the DCM. A convenient number is 8 which provides for some assurance that the light load condition is not merely momentary and avoid frequent mode changes. The mode change require 8 consecutive cycles with the negative event or 8 in a predetermined time or some combination such as 4 consecutive or 8 in a predetermined time as possible predetermined patterns that once detected results in the decision to make the mode change.

When logic 14 decides that the mode should be changed from CCM to DCM, logic 14 provides information to controller 16 that transistor 28 should be disabled earlier in the cycle and in that instant is also provided by logic 14. In each cycle, regardless of mode, integrator 20 is reset to zero by logic 14 at the beginning of transistor 26 becoming conductive. Resetting integrator 20 to zero means presetting the output of integrator 20 to the threshold voltage of zero crossing comparator 21. This begins the portion of the cycle where current is increasing in inductor 22. This also initiates integrator 20 performing an integration of the voltage difference between nodes 36 and 38. This integration is scaled by an amplifier (not separately shown) which is considered part of integrator 20. While transistor 26 is enabled, voltage Vi is relatively high and its value is a measure of the current stored in inductor 22. The output of integrator 20, which begins at zero after being reset, increases during the time that transistor 26 is enabled. As an integration of Vi, the output of integrator 20 is a measure of the current stored in inductor 22. When transistor 28 becomes conductive, voltage Vi drops below the voltage at the output so that the integration performed by integrator 20 results in the output of integrator 20 dropping.

The output of integrator 20 dropping to zero, which is the initial condition at reset, means that the current flowing in inductor 22 has reduced back to the value at the beginning of the cycle when transistor 26 was made conductive. Comparator 21 detects this zero crossing and provides an output to logic 14 to indicate that this has occurred. In CCM, the output of comparator 21 is ignored by logic 14. When logic 14 decides that DCM should be entered, logic 14 responds to the comparator output by sending a signal to controller 16 that transistor 28 should be disabled. Controller 16 and gate drive 18 respond by disabling transistor 28 at a time that is very close to if not exactly the time that current Ii has reached zero. In this condition, inductor 22 is substantially depleted of current and Vi will ring. With transistor 28 disabled, current Ii does not go negative but stays at zero. Thus, there is no power loss due to current Ii going negative.

When the clock indicates that it is time for transistor 26 to be enabled, duty controller 16 initiates the required signals and gate drive 18 responds so that transistor 26 becomes conductive. While this is occurring, logic 14 responds by resetting integrator 20. Integrator 20 again attains a measure of the current flowing in inductor 20 during transistor 26 being enabled. This value is then integrated, downward in this case, also during transistor 28 being enabled until zero is reached. Comparator 20 indicates this zero crossing to logic 14 which similarly responds by indicating to controller 16 that transistor 28 should be disabled which action is performed. Again with the precise measure of current stored and current used, voltage Vi stays at zero and current Ii also stays at zero. This continues as shown in FIG. 4 as long as the load remains light.

As the load increases, controller 16 will respond with a duty cycle that causes more current to be built-up in inductor 22. The time period for transistor 28 being enabled will become such that the downward integration does not actually reach zero before it is time for transistor 26 to become enabled again. In this situation, DC to DC converter 10 is functioning the same as in CCM. If this continues, logic 14 will switch out of DCM mode. In this transition period where the selected mode is DCM but the operation is CCM, if a cycle does occur in which the output of comparator 21 indicates that transistor 28 should be disabled early, this will occur. When logic 14 has selected CCM mode, even if the output of comparator 21 indicates that transistor 28 should be disabled early, transistor 28 will remain conductive for its allotted portion of the cycle. Logic 14 may similarly use 8 cycles of CCM operation for the determination that CCM should be the selected mode.

Thus, it is seen that a transition from CCM to DCM can result in power savings and the use of an integrator to calculate the time for the early disabling of transistor 28 is effective.

By now it should be appreciated that there has been provided a DC to DC converter having a first transistor coupled between a first power supply terminal and a first node. The DC to DC converter further includes a second transistor coupled between the first node and a second power supply terminal. The DC to DC converter further includes a first diode coupled in parallel with the first transistor between the first node and the first power supply terminal. The DC to DC converter further includes a second diode coupled in parallel with the second transistor between the first node and the second power supply terminal. The DC to DC converter further includes an inductor having a first terminal coupled to the first node and a second terminal coupled to an output terminal for receiving a variable load. The DC to DC converter further includes transistor drive circuitry coupled to the first transistor and second transistor, the transistor drive circuitry controlling conduction of the first and second transistor in a non-overlapping conduction operation. The DC to DC converter further includes a duty cycle controller coupled to the transistor drive circuitry for controlling a duty cycle for each of the first transistor and the second transistor to be conductive. The DC to DC converter further includes control circuitry coupled to the duty cycle controller for determining a mode of operation of the DC to DC converter by monitoring cycles of operation and detecting a predetermined pattern of cycles in which inductor current becomes negative, wherein a first mode of operation permits both the first transistor and the second transistor to alternately conduct and a second mode of operation does not permit the second transistor to conduct during each cycle when the inductor current is reduced to substantially zero. The DC to DC converter may have a further characterization by which the control circuitry comprises: an integrator having a first input coupled to the first node, a second input coupled to the output terminal and an output, the integrator integrating voltage across the inductor; and a zero crossing comparator circuit having an input coupled to the output of the integrator, the zero crossing detector circuit having an output for indicating when the output of the integrator is zero and when to make the second transistor conductive. The DC to DC converter may have a further characterization by which control circuitry further comprises a negative event detector circuit having a first input coupled to the first node, a second input coupled to an output of the duty cycle controller, and an output for detecting each cycle in which the inductor current becomes negative. The DC to DC converter may have a further characterization by which control circuitry further comprises logic circuitry coupled to the negative event detector circuit, the zero crossing comparator circuit and the duty cycle controller, the logic circuitry using negative event information from the negative event detector circuit to indicate to the duty cycle controller whether the DC to DC converter should be in the first mode of operation or the second mode of operation. The DC to DC converter may have a further characterization by which the logic circuitry requires a combination of a first predetermined number of cycles of having a negative event in each cycle before implementing a change from the first mode of operation to the second mode of operation and a second predetermined number of negative events within a predetermined amount of time. The DC to DC converter may have a further characterization by which the logic circuitry requires a first predetermined number of cycles of having a negative event in each cycle within a second predetermined number of cycles before implementing a change from the first mode of operation to the second mode of operation. The DC to DC converter may have a further characterization by which the logic circuitry further comprises a counter for counting negative events wherein a count value is used by the logic circuitry to determine whether the DC to DC converter should be in the first mode of operation or the second mode of operation. The DC to DC converter may have a further characterization by which the logic circuitry has a reset output coupled to the integrator for resetting the integrator each cycle when the DC to DC converter is in the second mode of operation.

Also described is, in a DC to DC converter, a method including controlling conduction of first and second series-connected transistors coupled between first and second power supply voltage terminals and to an inductor coupled to an output terminal, the conduction being controlled in a non-overlapping conduction operation. The method further includes monitoring cycles of operation and detecting a predetermined number of cycles in which inductor current becomes negative. The method further includes controlling the DC to DC converter to operate in a first mode of operation in response to no more than a predetermined number of cycles within a predetermined time having negative inductor current, the first mode of operation permitting both the first and second series-connected transistors to alternately conduct. The method further includes controlling the DC to DC converter to operate in a second mode of operation in response to detecting occurrence of the predetermined number of cycles within the predetermined time in which negative inductor current exists, the second mode of operation not permitting the second transistor to conduct during each cycle when the inductor current is reduced to substantially zero. The method may further comprise integrating voltage across the inductor and detecting when a result of the integrating becomes zero in order to not permit the second transistor to conduct when the DC to DC converter is in the second mode of operation. The method may further comprise detecting a number of cycles in which inductor current becomes negative and determining to exit the first mode of operation and enter the second mode of operation upon occurrence of a predetermined number of consecutive cycles in which inductor current becomes negative. The method may further comprise detecting a number of cycles in which inductor current becomes negative and determining to exit the first mode of operation and enter the second mode of operation upon occurrence of a predetermined number of cycles in which inductor current becomes negative during a predetermined amount of time. The method may further comprise using a counter to count a number of times inductor current becomes negative and using a count value to determine whether the DC to DC converter is in the first mode of operation or the second mode of operation.

Described also is a DC to DC converter having a first transistor coupled between a first power supply terminal and a first node. The DC to DC converter further comprises a second transistor coupled between the first node and a second power supply terminal. The DC to DC converter further comprises a first diode coupled in parallel with the first transistor between the first node and the first power supply terminal. The DC to DC converter further comprises a second diode coupled in parallel with the second transistor between the first node and the second power supply terminal. The DC to DC converter further comprises an inductor having a first terminal coupled to the first node and a second terminal coupled to an output terminal for receiving a variable load. The DC to DC converter further comprises transistor gate drive circuitry coupled to a gate of each of the first transistor and second transistor, the transistor gate drive circuitry alternately making the first and second transistor conduct without both transistors conducting concurrently. The DC to DC converter further comprises a duty cycle controller coupled to the transistor drive circuitry for controlling a portion of each cycle of a plurality of successive cycles of the DC to DC converter for each of the first transistor and the second transistor to be conductive. The DC to DC converter further comprises control circuitry coupled to the duty cycle controller for determining a mode of operation of the DC to DC converter by detecting a change in value of a load coupled to the inductor by detecting when current in the inductor becomes zero and determining that negative inductor current exists in a predetermined minimum number of cycles, the control circuitry placing the DC to DC converter in a first mode of operation if negative inductor current does not exist for at least the predetermined minimum number of cycles and placing the DC to DC converter in a second mode of operation if negative inductor current does exist for at least the predetermined minimum number of cycles, wherein the first mode of operation permits both the first transistor and the second transistor to alternately conduct and the second mode of operation does not permit the second transistor to conduct during each cycle when the current in the inductor is reduced to substantially zero. The DC to DC converter may have a further characterization by which the control circuitry further comprises an integrator having a first input coupled to the first node, a second input coupled to the output terminal and an output, the integrator integrating voltage across the inductor; and a zero crossing comparator circuit having an input coupled to the output of the integrator, the zero crossing detector circuit having an output for indicating when the output of the integrator is zero. The DC to DC converter may have a further characterization by which the logic circuitry has a reset output coupled to the integrator for resetting the integrator each cycle when the DC to DC converter is in the second mode of operation. The DC to DC converter may have a further characterization by which control circuitry further comprises a negative event detector circuit having a first input coupled to the first node, a second input coupled to an output of the duty cycle controller, and an output for detecting each cycle in which the current in the inductor becomes negative. The DC to DC converter may have a further characterization by which control circuitry further comprises logic circuitry coupled to the negative event detector circuit, the zero crossing comparator circuit and the duty cycle controller, the logic circuitry using negative event information from the negative event detector circuit to indicate to the duty cycle controller whether the DC to DC converter should be in the first mode of operation or the second mode of operation. The DC to DC converter may have a further characterization by which the logic circuitry requires a predetermined number of consecutive cycles of having a negative event in each cycle before implementing a change from the first mode of operation to the second mode of operation. The DC to DC converter may have a further characterization by which the logic circuitry further comprises a counter for counting negative events wherein a count value is used by the logic circuitry to determine whether the DC to DC converter should be in the first mode of operation or the second mode of operation.

Although the invention is described herein with reference to specific embodiments, various modifications and changes can be made without departing from the scope of the present invention as set forth in the claims below. For example, transistor 26 is described as an N channel transistor but by reversing the logic state of the enabling signal, transistor 26 could be a P channel transistor. Also there may be some intentional margin applied so that transistor 28 could be held conductive a little longer to ensure that some relatively small amount of negative current of current Ii did occur and still be considered substantially zero. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A DC to DC converter, comprising:
    a first transistor coupled between a first power supply terminal and a first node;
    a second transistor coupled between the first node and a second power supply terminal;
    a first diode coupled in parallel with the first transistor between the first node and the first power supply terminal;
    a second diode coupled in parallel with the second transistor between the first node and the second power supply terminal;
    an inductor having a first terminal coupled to the first node and a second terminal coupled to an output terminal for receiving a variable load;
    transistor drive circuitry coupled to the first transistor and second transistor, the transistor drive circuitry controlling conduction of the first and second transistor in a non-overlapping conduction operation;
    a duty cycle controller coupled to the transistor drive circuitry for controlling a duty cycle for each of the first transistor and the second transistor to be conductive; and
    control circuitry coupled to the duty cycle controller for determining a mode of operation of the DC to DC converter by monitoring cycles of operation and detecting a predetermined pattern of cycles in which inductor current becomes negative, wherein a first mode of operation permits both the first transistor and the second transistor to alternately conduct and a second mode of operation does not permit the second transistor to conduct during each cycle when the inductor current is reduced to substantially zero.

2. The DC to DC converter of claim 1 wherein the control circuitry further comprises:
    an integrator having a first input coupled to the first node, a second input coupled to the output terminal and an output, the integrator integrating voltage across the inductor; and
    a zero crossing comparator circuit having an input coupled to the output of the integrator, the zero crossing detector circuit having an output for indicating when the output of the integrator is zero and when to make the second transistor conductive.

3. The DC to DC converter of claim 2 wherein the control circuitry further comprises:
    a negative event detector circuit having a first input coupled to the first node, a second input coupled to an output of the duty cycle controller, and an output for detecting each cycle in which the inductor current becomes negative.

4. The DC to DC converter of claim 3 wherein the control circuitry further comprises:
    logic circuitry coupled to the negative event detector circuit, the zero crossing comparator circuit and the duty cycle controller, the logic circuitry using negative event information from the negative event detector circuit to indicate to the duty cycle controller whether the DC to DC converter should be in the first mode of operation or the second mode of operation.

5. The DC to DC converter of claim 4 wherein the logic circuitry requires a combination of a first predetermined number of cycles of having a negative event in each cycle before implementing a change from the first mode of operation to the second mode of operation and a second predetermined number of negative events within a predetermined amount of time.

6. The DC to DC converter of claim 4 wherein the logic circuitry requires a first predetermined number of cycles of having a negative event in each cycle within a second predetermined number of cycles before implementing a change from the first mode of operation to the second mode of operation.

7. The DC to DC converter of claim 6 wherein the logic circuitry further comprises a counter for counting negative events wherein a count value is used by the logic circuitry to determine whether the DC to DC converter should be in the first mode of operation or the second mode of operation.

8. The DC to DC converter of claim 2 wherein the logic circuitry has a reset output coupled to the integrator for resetting the integrator each cycle when the DC to DC converter is in the second mode of operation.

9. In a DC to DC converter, a method comprising:
controlling conduction of first and second series-connected transistors coupled between first and second power supply voltage terminals and to an inductor coupled to an output terminal, the conduction being controlled in a non-overlapping conduction operation;
monitoring cycles of operation and detecting a predetermined number of cycles in which inductor current becomes negative;
controlling the DC to DC converter to operate in a first mode of operation in response to no more than a predetermined number of cycles within a predetermined time having negative inductor current, the first mode of operation permitting both the first and second series-connected transistors to alternately conduct; and
controlling the DC to DC converter to operate in a second mode of operation in response to detecting occurrence of the predetermined number of cycles within the predetermined time in which negative inductor current exists, the second mode of operation not permitting the second transistor to conduct during each cycle when the inductor current is reduced to substantially zero.

10. The method of claim 9 further comprising:
integrating voltage across the inductor; and
detecting when a result of the integrating becomes zero in order to not permit the second transistor to conduct when the DC to DC converter is in the second mode of operation.

11. The method of claim 10 further comprising:
detecting a number of cycles in which inductor current becomes negative; and
determining to exit the first mode of operation and enter the second mode of operation upon occurrence of a predetermined number of consecutive cycles in which inductor current becomes negative.

12. The method of claim 10 further comprising:
detecting a number of cycles in which inductor current becomes negative; and
determining to exit the first mode of operation and enter the second mode of operation upon occurrence of a predetermined number of cycles in which inductor current becomes negative during a predetermined amount of time.

13. The method of claim 10 further comprising:
using a counter to count a number of times inductor current becomes negative; and
using a count value to determine whether the DC to DC converter is in the first mode of operation or the second mode of operation.

14. A DC to DC converter, comprising:
a first transistor coupled between a first power supply terminal and a first node;
a second transistor coupled between the first node and a second power supply terminal;
a first diode coupled in parallel with the first transistor between the first node and the first power supply terminal;
a second diode coupled in parallel with the second transistor between the first node and the second power supply terminal;
an inductor having a first terminal coupled to the first node and a second terminal coupled to an output terminal for receiving a variable load;
transistor gate drive circuitry coupled to a gate of each of the first transistor and second transistor, the transistor gate drive circuitry alternately making the first and second transistor conduct without both transistors conducting concurrently;
a duty cycle controller coupled to the transistor drive circuitry for controlling a portion of each cycle of a plurality of successive cycles of the DC to DC converter for each of the first transistor and the second transistor to be conductive; and
control circuitry coupled to the duty cycle controller for determining a mode of operation of the DC to DC converter by detecting a change in value of a load coupled to the inductor by detecting when current in the inductor becomes zero and determining that negative inductor current exists in a predetermined minimum number of cycles, the control circuitry placing the DC to DC converter in a first mode of operation if negative inductor current does not exist for at least the predetermined minimum number of cycles and placing the DC to DC converter in a second mode of operation if negative inductor current does exist for at least the predetermined minimum number of cycles, wherein the first mode of operation permits both the first transistor and the second transistor to alternately conduct and the second mode of operation does not permit the second transistor to conduct during each cycle when the current in the inductor is reduced to substantially zero.

15. The DC to DC converter of claim 14 wherein the control circuitry further comprises:
an integrator having a first input coupled to the first node, a second input coupled to the output terminal and an output, the integrator integrating voltage across the inductor; and
a zero crossing comparator circuit having an input coupled to the output of the integrator, the zero crossing detector circuit having an output for indicating when the output of the integrator is zero.

16. The DC to DC converter of claim 15 wherein the logic circuitry has a reset output coupled to the integrator for resetting the integrator each cycle when the DC to DC converter is in the second mode of operation.

17. The DC to DC converter of claim 15 wherein the control circuitry further comprises:
a negative event detector circuit having a first input coupled to the first node, a second input coupled to an output of the duty cycle controller, and an output for detecting each cycle in which the current in the inductor becomes negative.

18. The DC to DC converter of claim 17 wherein the control circuitry further comprises:

logic circuitry coupled to the negative event detector circuit, the zero crossing comparator circuit and the duty cycle controller, the logic circuitry using negative event information from the negative event detector circuit to indicate to the duty cycle controller whether the DC to DC converter should be in the first mode of operation or the second mode of operation.

19. The DC to DC converter of claim 18 wherein the logic circuitry requires a predetermined number of consecutive cycles of having a negative event in each cycle before implementing a change from the first mode of operation to the second mode of operation.

20. The DC to DC converter of claim 18 wherein the logic circuitry further comprises a counter for counting negative events wherein a count value is used by the logic circuitry to determine whether the DC to DC converter should be in the first mode of operation or the second mode of operation.

* * * * *